(12) United States Patent
Dillman

(10) Patent No.: US 6,839,017 B1
(45) Date of Patent: Jan. 4, 2005

(54) METHOD AND APPARATUS FOR USING ANTI-JAM TECHNOLOGY TO DETERMINE THE LOCATION OF AN ELECTROMAGNETIC RADIATION SOURCE

(75) Inventor: David J. Dillman, Marion, IA (US)

(73) Assignee: Rockwell Collins, Cedar Rapids, IA (US)

( * ) Notice: Subject to any disclaimer, the term of this patent is extended or adjusted under 35 U.S.C. 154(b) by 8 days.

(21) Appl. No.: 10/630,052

(22) Filed: Jul. 30, 2003

(51) Int. Cl.$^7$ ................................................. G01S 7/36
(52) U.S. Cl. ........................... 342/16; 342/17; 342/62; 342/146; 342/147; 342/156
(58) Field of Search ............................. 342/13, 16, 17, 342/62, 63, 89, 90, 91, 139, 141, 146, 147, 156, 195, 372, 381, 384, 395, 398, 430, 450, 463

(56) References Cited

U.S. PATENT DOCUMENTS

| | | | | |
|---|---|---|---|---|
| 2,975,417 A | * | 3/1961 | Alexander et al. .......... 342/398 |
| 2,976,530 A | * | 3/1961 | Werner et al. .............. 342/463 |
| 2,983,442 A | * | 5/1961 | Abt et al. .................... 235/404 |
| 2,986,732 A | * | 5/1961 | Marshburn .................. 342/395 |
| 4,845,502 A | * | 7/1989 | Carr et al. ................... 342/430 |
| 5,685,504 A | * | 11/1997 | Schneider et al. ......... 244/3.11 |
| 5,694,133 A | * | 12/1997 | Ghose ........................ 342/372 |
| 6,091,361 A | | 7/2000 | Davis et al. ................ 342/378 |
| 6,147,640 A | * | 11/2000 | Wachs ........................ 342/354 |
| 6,252,540 B1 | | 6/2001 | Hale et al. .................. 342/159 |
| 6,388,611 B1 | | 5/2002 | Dillman ................. 342/357.06 |

OTHER PUBLICATIONS

"Comparison of monostatic and bistatic bearing estimation performance for low RCS targets", Boyle, R.J.; Wasylkiwskyj, W.;Aerospace and Electronic Systems, IEEE Transactions on , vol.: 30, Issue: 3 , Jul. 1994 pp.: 962–968.*

* cited by examiner

*Primary Examiner*—John B. Sotomayor
(74) *Attorney, Agent, or Firm*—Nathan O. Jensen; Kyle Eppele

(57) ABSTRACT

A system employs null angle measurements developed in response to the detection of radiation, such as jamming, along with the positions at which the null angles are measured, to determine the location of the radiation source through reverse triangulation.

32 Claims, 3 Drawing Sheets

METHOD AND APPARATUS FOR USING ANTI-JAM TECHNOLOGY TO DETERMINE THE LOCATION OF AN ELECTROMAGNETIC RADIATION SOURCE

FIELD OF THE INVENTION

The invention relates to electromagnetic radiation and, more particularly, to systems and methods using anti-jam technology to determine the location of an electromagnetic radiation source.

BACKGROUND OF THE INVENTION

Electromagnetic interference may take many forms and have widely varying impacts. Localized radiation sources may interfere with commercial aviation guidance and landing systems. Intentional jamming may cause a guided missile to go off-course, with serious consequences for non-combatants and for the missile's launchers.

The intentional jamming of guidance systems, with attendant life and death consequences, is of particular concern. A jamming source, also referred to herein as a "jammer," may be employed to disrupt a guidance system, such as that of a missile, by overwhelming the guidance system receiver's front end. For example, in the case of a RADAR-guided missile, a jammer directs radiation of a frequency and format consistent with that employed by the missile's guidance system toward the missile in an attempt to deliver enough radiation to the guidance system's receiver to "swamp" the receiver, thereby "drowning out" the desired, guidance, signals. Because the jamming signal is not omni-directional, counter-measures that adjust the sensitivity of receivers may be employed to ameliorate the effects of such jamming. Space time adaptive processing (STAP) may be employed to determine the direction from which a jamming signal emanates. This directional information may then be employed to adjust the sensitivity of the missile's receiver, thereby forming one or more "null" sensitivity patterns. Space time adaptive processing is known and discussed, for example, in U.S. Pat. No. 6,091,361, entitled, "METHOD AND APPARATUS FOR JOINT SPACE-TIME ARRAY SIGNAL PROCESSING", issued to Davis et al and in U.S. Pat. No. 6,252,540, entitled, "APPARATUS METHOD FOR TWO STAGE HYBRID SPACE-TIME ADAPTIVE PROCESSING IN RADAR AND COMMUNICATIONS SYSTEMS", issued to Hale et al, which are hereby incorporated by reference. Although such anti-jamming devices are somewhat effective, locating the jamming source, rather than simply determining the direction in which it lies, would provide for a more effective solution to the problem (e.g., eliminating the radiation source in the case of a missile-guidance jammer).

A system and method that identifies the location of a radiation source would be particularly valuable, not only in thwarting guidance-system jamming, but in the location of other radiation sources.

SUMMARY

Systems and methods in accordance with the principles of the invention employ "null" angle measurements developed in response to the detection of a radiation source, along with the positions at which the null angles are measured to "reverse triangulate" and thereby determine the location of the radiation source. In accordance with the principles of the present invention, the null angles may be developed by a digital spatial nuller that employs a space frequency adaptive processing (SFAP) or space time adaptive processing (STAP), for example.

In an illustrative embodiment, a Global Positioning System (GPS) guided missile employs a system and method in accordance with the principles of the present invention to determine the location of a jamming source. Such a jamming source may be employed to disrupt the missile's guidance system by bathing the missile in radiation that overwhelms the missile's GPS receiver's front end. Because such radiation is not omni-directional, the GPS receiver system may diminish the effects of the jamming radiation by reducing its sensitivity in the direction of the jamming source, that is, by developing "nulls" in the receiver's sensitivity pattern. The system may employ spatial nulling methods to develop a sensitivity pattern and to determine the angle of one or more nulls in the sensitivity pattern. Such angles are referred to herein as null angles. In accordance with the principles of the present invention, a controller employs a plurality of null angles, along with the positions at which those angles are determined, to compute the location of, not just the direction to, the jamming source.

Although such a computation may be performed using only two null angles, along with their associated positions, each null angle measurement has some uncertainty associated with it. Consequently, a system in accordance with the principles of the present invention may employ three or more angle measurements, along with their corresponding positions, to improve the calculation of the radiation source's location. The multiple location estimates may be combined using various statistical methods to reduce the uncertainty of the location. Kalman filtering may be employed to increase the accuracy of the location calculation.

In accordance with the principles of the present invention, null angles and related position information may be developed by existing systems, such as RADAR or GPS guidance systems that employ digital spatial nulling processes, in order to diminish the effects of jamming. In such an illustrative embodiment, the invention utilizes the existing null angle and position measurements to compute the radiation source's location. The system may compute the location locally, e.g., within a moving object, such as a missile or surveillance drone, or position and null angle information may be transmitted to a controller where the computation may be performed. The controller that receives such information may be included in another null angle determining object, or may be a component of another device, such as a central controller, to which the computational tasks are off-loaded.

The multiple null angle measurements and associated positions may be produced by a single, moving, object, such as a missile or other aircraft, a terrestrial vehicle, a marine vehicle, or a human-portable object, for example. Combinations of moving and/or stationary measuring objects are contemplated within the scope of the invention and one or more objects may be temporarily or permanently fixed in position.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
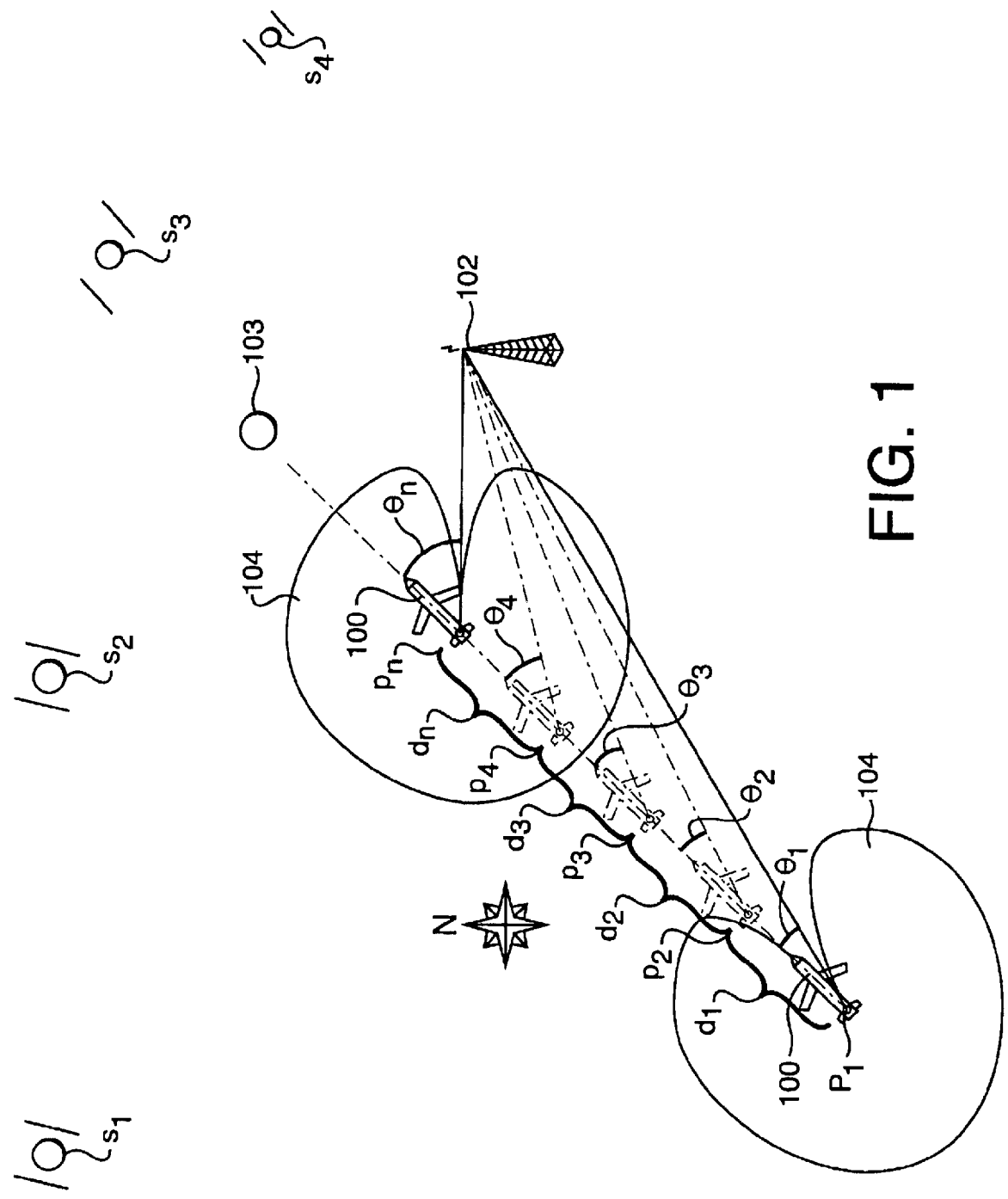
FIG. 1 is a conceptual diagram that provides an overview of an illustrative GPS missile embodiment of the present invention.

In the illustrative embodiment of the conceptual diagram of FIG. 1 (not to scale), a Global Positioning System (GPS) guided missile 100 employs a system and method in accordance with the principles of the present invention to determine the location of a jamming source 102. The term "GPS" will be used herein to refer to any of a variety of GPS systems and devices, including those equipped to implement differential GPS schemes. The jamming source 102 may be employed to disrupt the missile's guidance system. Four satellites: $S_1$, $S_2$, $S_3$ and $S_4$ are "visible" to the missile 100. In this illustrative embodiment, the missile 100 is launched towards a primary target 103.

The GPS system employs twenty-four Earth-orbiting satellites, each of which circle the globe at orbits of approximately 12,000 miles, making two complete revolutions every day. The orbits are arranged so that there are at least four satellites visible at any time anywhere on Earth. Each satellite generates and transmits pseudo-random codes at predetermined intervals. Each GPS receiver locates four or more of the satellites and generates the same pseudo-random codes at the same time intervals as the satellites. By comparing an internally generated pseudo-random code to codes received from each of the satellites, the GPS receiver can determine the delay between the code's generation and its arrival at the receiver and, consequently, can determine the distance between the receiver and each of the satellites "in view." Each GPS receiver stores an almanac that includes the expected position of each satellite in the constellation at all times. As that position information is adjusted by a central controller, the almanac is updated. After determining the distance from itself to each of at least four GPS satellites, a GPS receiver (described in greater detail in relation to the discussion of the block diagram of FIG. 2) within the missile 100 employs trilateration to determine its own location, which may be in terms of geo-reference coordinates.

The GPS receiver system within the missile 100 may diminish the effects of the jamming radiation by reducing its sensitivity in the direction of the jamming source. This may be accomplished by developing "nulls" in the receiver's sensitivity pattern 104. The system may employ space time adaptive processing to develop the sensitivity pattern 104 and to determine the angle of one or more nulls in the sensitivity pattern. Null angles $\theta_1$, $\theta_2$, $\theta_3$, $\theta_4$, and $\theta_n$ correspond to positions $P_1$, $P_2$, $P_3$, $P_4$, and $P_n$ and baseline segments $D_1$, $D_2$, $D_3$, and $D_n$ respectively correspond to the differences between positions $P_1$ and $P_2$; $P_2$ and $P_3$; $P_3$ and $P_4$; and $P_4$, and $P_n$.

In accordance with the principles of the present invention, a controller employs a plurality of null angles (e.g., $\theta_1$, $\theta_2$, $\theta_3$, $\theta_4$, and $\theta_n$) along with the associated positions (the positions at which those angles are determined, e.g., positions $P_1$, $P_2$, $P_3$, $P_4$, and $P_n$), to compute the location of the jamming source. Given the positions and associated null angles, known techniques may be used to compute the location of the source. Such techniques are described, for example, in U.S. Pat. No. 6,388,611, entitled, "METHOD AND SYSTEM FOR DYNAMIC SURVEILLANCE OF A REMOTE OBJECT USING GPS," issued to David J. Dillman, which is hereby incorporated by reference.

Although such a computation may be performed using only two null angles (e.g., $\theta_1$, and $\theta_n$), along with their associated positions (e.g., positions $P_1$, and $P_n$), each null angle measurement has some uncertainty associated with it. Consequently, a system in accordance with the principles of the present invention may employ three or more angle measurements, along with their corresponding positions, to improve the calculation of the radiation source's location. The multiple location estimates may be combined using various statistical methods to reduce the uncertainty of the location. Kalman filtering may be employed to increase the accuracy of the location calculation.

The multiple null angle measurements and associated positions may be produced by a single, moving, object, such as the missile 100 or other aircraft, a terrestrial vehicle, a marine vehicle, or a human-portable object, for example. Combinations of moving and/or stationary measuring objects are contemplated within the scope of the invention and one or more objects may be temporarily or permanently fixed.

Figure 2:
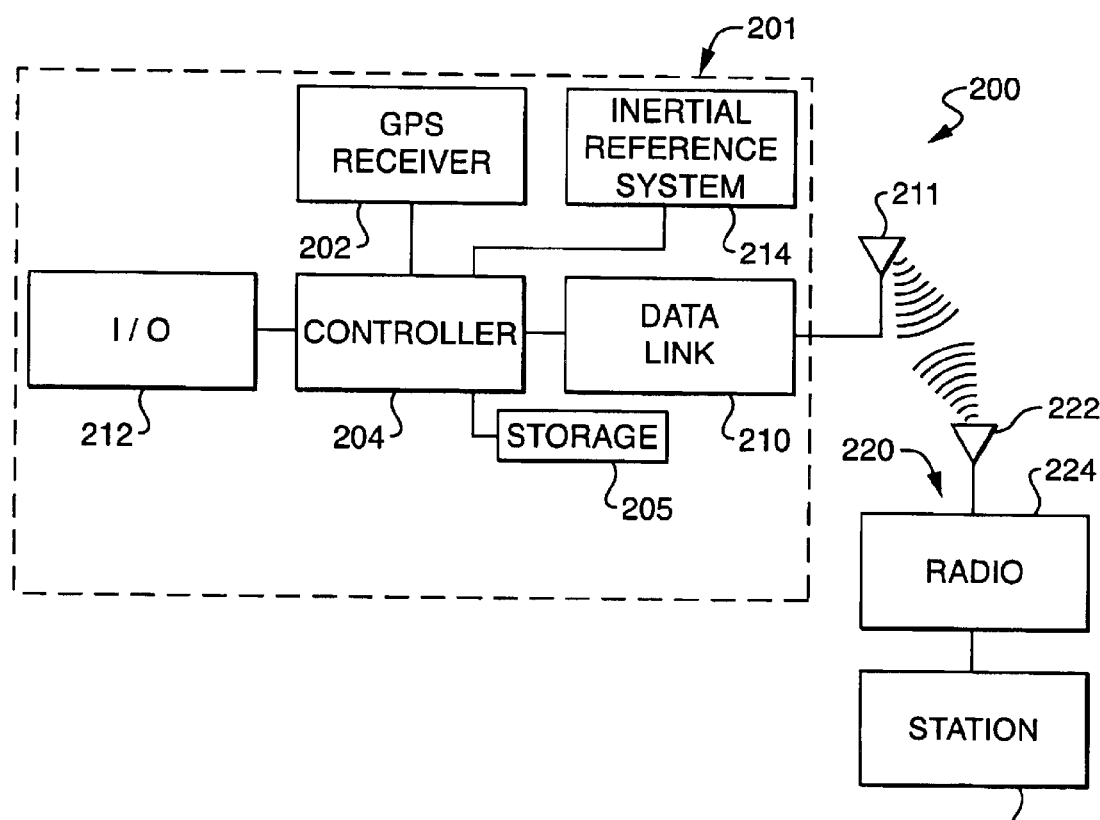
FIG. 2 is a conceptual block diagram of a system that includes a radiation source locator in accordance with the principles of the present invention.

In accordance with the principles of the present invention, null angles may be developed and related position information may be derived by existing systems, such as RADAR or GPS guidance systems that employ digital spatial nulling processes, in order to diminish the effects of jamming, for example. In such an illustrative embodiment, the invention may employ the existing null angle and position measurements to compute the radiation source's location. The conceptual block diagram of FIG. 2 depicts the components of an illustrative radiation-source-locating object 201 in accordance with the principles of the present invention. As previously mentioned, the source-locating object may reside in or be mounted on any of a variety of platforms, mobile or stationary. The object 201 includes a GPS receiver 202, which may be any type of positioning system, such as Glonass, Loran, or others. A controller 204 may include components known in the art, such as volatile memory, nonvolatile memory, digital signal processing hardware, analog circuitry, analog-to-digital or digital-to-analog conversion facilities, or math coprocessors, for example, along with whatever software may be required to operate conventional tasks or to perform source-location functions in accordance with the principles of the present invention. In this illustrative embodiment, the controller 204 includes interfaces to an input/output subsystem 212, to a GPS receiver 202, to an inertial reference system 214, to storage 205, and to a data link 210, which is connected to an antenna 211.

The input/output subsystem 212 may include such input devices as a keyboard, buttons, switches, or touch-screens, for example, and may include output devices such as one or more display, indicator lights, or audio output, for example. The GPS receiver 202 may include the hardware and software necessary for the detection a radiation source and the creation of sensitivity patterns that include nulls, as previously described, or, the controller 204 may perform those tasks. The inertial reference system 214 may include a gyroscope, and accelerometer, or an electronic compass, for example. In this illustrative embodiment, the inertial reference system 214 may be used to supplement the GPS receiver 202. The storage 205 may include program storage for higher-level operations, such as the computations involved in determining the location of a radiation source in accordance with the principles of the present invention. The data link 210 and antenna 211 may be used to transmit information to a central controller located at a command and control center 220 represented in this Figure by antenna 222, radio 224, and station 226, or, as previously described, to another radiation-source-locating object. The information transmitted may be raw information, such as a null angle and corresponding position, it may be partially reduced information, such as baseline distances (that is, the distance between two null angle measurement positions), or it may be computed radiation source location information that may be based on one or more baseline/null-angle-pair combinations.

Figure 3:
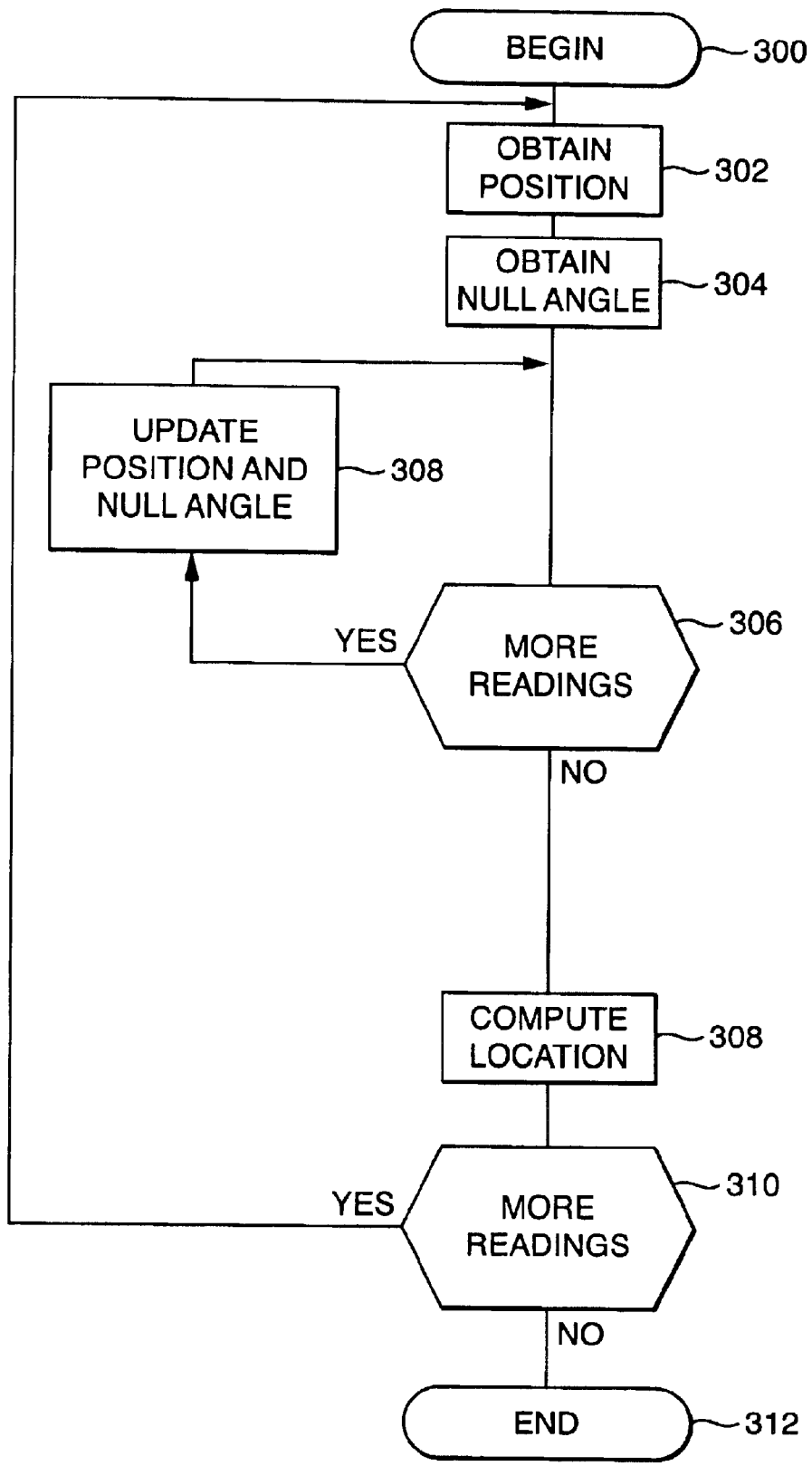
FIG. 3 is a flow chart that depicts a process in accordance with the principles of the present invention.

Turning now to the flow chart of FIG. 3, the process of locating a radiation source in accordance with the principles of the present invention will be set forth in general terms. That is, this illustrative embodiment is not meant to restrict the invention to the exact steps or sequence of steps set forth and described in the discussion related to FIG. 3. As is known in the art, steps in the process may be broken down into sub-steps and combined in different sequences and some steps described may be executed in parallel, rather than in the strictly sequential fashion to which a flow chart description lends itself. The illustrative process of locating a radiation source (e.g., a jammer, or a pirate radio, for example) begins in step 300 and proceeds from there to step 302, where position information related to a null angle is obtained.

The position information may be obtained from a Global positioning system and may be in the form of geo-reference coordinates, or offsets from known locations, for example. From step 302 the process proceeds to step 304, where null angle measurements corresponding to the position information are obtained. As previously described, the null angle measurements may be produced, for example, in response to received radiation by anti-jamming RADAR or GPS systems that employ a process such as space time adaptive processing. Null angles may be expressed in any of a variety of conventional forms. They may be expressed in reference to magnetic or true North, or in terms of bearing angle minus heading angle, for example.

From step 304 the process proceeds to step 306 where it is determined whether more readings are to be obtained. If more readings are to be obtained, the process proceeds to step 308, where additional position and associated null angle measurements are obtained. The additional measurements may be obtained from the same, moving, object through its GPS receiver, for example, or from another location measurement object through the data link 210, for example. After a desired number of measurements have been obtained (the desired number may be predetermined, or may be determined based upon a convergence algorithm related to an uncertainty figure of merit, for example), the process proceeds from step 306 to step 308 where one or more values for the radiation source location are computed.

The computation process may employ statistical techniques, such averaging, which may be weighted, to produce a location value that combines values associated with a plurality of baseline/null angle pairs. Kalman filtering may also be employed to refine the location estimate. Generally, two null angles and their associated positions may be used to form a triangle, with the first and second sides of the triangle respectively formed by drawing lines from the first and second null angle position acquisition points in the direction of the first and second null angles. The distance between the two null angle positions forms the baseline of the triangle (e.g., the difference between positions $P_2$ and $P_1$ of FIG. 1, forms the baseline $D_1$, the difference between positions $P_3$ and $P_2$ forms the baseline $D_2$ and the difference between positions $P_1$ and $P_3$ forms the baseline $D_{13}$ (not shown)). Using well-known techniques of Euclidian geometry the length of either side of the triangle can be calculated. Given the position, corresponding null angle, and side length, the location of the radiation source may be determined and may be expressed in terms of latitude and longitude, for example. Latitude and longitude may be expressed in any of a variety of units of measure. Any geo-reference systems, such as latitude and longitude, may be used to express the location of the source in relation to the earth, or, the location may be expressed as an offset in relation to a known object, such as a mobile or stationary platform for launching countermeasures (or a FCC enforcement officer in the case of a pirate radio station). The system may compute the radiation source's location locally, e.g., within a moving object, such as a missile or drone, or coordinate and null angle information may be transmitted to a controller where the computation may be performed. The controller that receives such information may be included in another null angle determining object, or may be a component of another device, such as a central controller (e.g., in the station 226 of FIG. 2), to which the computational tasks are off-loaded.

From step 308, the process proceeds to step 310, where it is determined whether additional radiation source position determinations are to be made. Such additional radiation source determinations could be related to the same source orto another radiation source. If more determinations are to be made, the process returns to step 302 and proceeds from there as previously described. If no more determinations are to be made the process proceeds to end in step 312.

A software implementation of the above described embodiment(s) may comprise a series of computer instructions either fixed on a tangible medium, such as a computer readable media or transmittable to a computer system, via a modem or other interface device over a medium. The medium can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Flow charts that illustrates processes herein have been employed for illustrative purposes only, and the processes described herein need exactly follow the sequences set forth in the description and may be implemented using different sequences and different combination of steps, which are contemplated by the scope of this invention. Further, the instructions of specific implementations may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be apparent to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. In a system that develops null angle measurements in response to a detection of radiation, a method of determining a location of a radiation source, comprising the steps of:
   obtaining position information related to the null angle measurements;
   determining at least one baseline distance associated with the null angle measurements; and
   computing the location of the radiation source using at least one baseline distance, along with associated null angles and related position information.

2. The method of claim 1 wherein the step of obtaining position information related to the null angle measurements comprises the step of:
   obtaining position information related to the null angle measurements made by a same moving object.

3. The method of claim 1 wherein the step of obtaining position information related to the null angle measurements comprises the step of:
   obtaining position information related to the null angle measurements made by a plurality of objects.

4. The method of claim 3 wherein the step of obtaining position information comprises the step of:
   obtaining position information related to the null angle measurements made by the plurality of objects, at least one of which is a moving object.

5. The method of claim 1 wherein the step of obtaining position information related to the null angle measurements comprises the step of:
   obtaining position information relating the null angle measurement to a predetermined location.

6. The method of claim 1 wherein the step of obtaining position information related to the null angle measurements comprises the step of:
   obtaining position information relating the null angle measurement to a geo-reference coordinate.

7. The method of claim 1 wherein the step of computing the location of the radiation source comprises the step of:
   employing the baseline distance, the related position information, and the associated null angle measurements to determine the radiation source location through reverse triangulation.

8. The method of claim 7 wherein the step of computing the location of the radiation source comprises the step of:

employing a plurality of baseline distances along with the related position information and associated null angle measurements to compute a plurality of location values for the radiation source location; and
   computing a best fit location value based upon the plurality of location values computed for the radiation source location.

9. The method of claim 8 wherein the step of computing a best-fit location value comprises the step of:
   Kalman filtering the location values.

10. The method of claim 1 further comprising the step of:
    transmitting at least one object location and the null angle information to a controller to enable the controller to compute the location of the radiation source.

11. The method of claim 1 further comprising the step of:
    obtaining position and null angle information for at least one object; and
    transmitting the position and null angle information to another object that is obtaining position and null angle information to thereby enable the object to which the position and null angle information is transmitted to compute the location of the radiation source.

12. The method of claim 1 further comprising the step of:
    transmitting the location of the radiation source to a receiving controller.

13. A method comprising the steps of:
    developing null angle measurements in response to a detection of radiation;
    obtaining position information related to the null angle measurements;
    determining at least one baseline distance associated with the null angle measurements;
    computing a location of a radiation source using at least one baseline distance, along with associated null angles and related position information; and
    transmitting the location of the radiation source to a receiving controller.

14. The method of claim 13 wherein the step of developing the null angle measurements comprises the step of:
    employing a digital spatial nuller to develop the null angle measurements.

15. The method of claim 14 wherein the step of employing a digital spatial nuller comprises the step of:
    employing STAP in conjunction with a radar system to develop the null angle measurements.

16. The method of claim 14 wherein the step of employing a digital spatial nuller comprises the step of:
    employing STAP in conjunction with a global positioning system (GPS) system.

17. In a system that develops null angle measurements in response to a detection of radiation, an apparatus for determining a location of a radiation source, comprising a controller configured to:
    obtain position information related to the null angle measurements;
    determine at least one baseline distance associated with the null angle measurements; and
    use at least one baseline distance, along with associated null angles and related position information, to compute the location of the radiation source.

18. The apparatus of claim 17 wherein the controller is configured to obtain position information related to the null angle measurements made by a same moving object.

19. The apparatus of claim 17 wherein the controller is configured to obtain position information related to the null angle measurements made by a plurality of objects.

20. The apparatus of claim 19 wherein the controller is configured to obtain position information related to the null angle measurements made by the plurality of objects, at least one of which is a moving object.

21. The apparatus of claim 17 wherein the controller is configured to obtain position information relating the null angle measurements to a predetermined location.

22. The apparatus of claim 17 wherein the controller is configured to obtain position information relating the null angle measurements to a geo-reference coordinate.

23. The apparatus of claim 17 wherein the controller is configured to employ the baseline distance, related position information, and associated null angle measurements to determine the radiation source location through reverse triangulation.

24. The apparatus of claim 23 wherein the controller is configured to employ a plurality of baseline distances along with associated position information and null angle measurements to compute a plurality of values for the radiation source location and to compute a best fit location value based upon the plurality of location values.

25. The apparatus of claim 24 wherein the controller is configured to Kalman filter the location values.

26. The apparatus of claim 17 further comprising:
a transmitter within one object said transmitter configured to transmit location and null angle information to the controller to enable the controller to compute the radiation source location.

27. The apparatus of claim 17 further comprising:
at least one object that is obtaining position and null angle information and transmitting the location and null angle information to another object that is obtaining position and null angle information to thereby enable the object to which the position and null angle information is transmitted to compute the radiation source location.

28. The apparatus of claim 17 wherein the controller is configured to transmit the location of the radiation source to a receiving controller.

29. An apparatus comprising a controller configured to develop null angle measurements in response to a detection of radiation; to obtain position information related to the null angle measurements; to determine at least one baseline distance associated with the null angle measurements; to use at least one baseline distance, along with associated null angles and related position information, to compute a location of a radiation source; and to transmit the radiation source location information to a receiving controller.

30. The apparatus of claim 29 wherein the controller is configured to employ a digital spatial nuller to develop the null angle measurements.

31. The apparatus of claim 30 wherein the controller is configured to employ STAP in conjunction with a radar system to develop the null angle measurements.

32. The apparatus of claim 30 wherein the controller is configured to employ STAP in conjunction with a global positioning system (GPS) system.

* * * * *